3,303,100
ENZYME DIGESTION OF NUCLEIC ACID
Louis Laufer and Sidney Gutcho, Bronx, N.Y., assignors to Schwarz Bioresearch, Inc., New York, N.Y.
No Drawing. Filed Oct. 3, 1963, Ser. No. 313,433
17 Claims. (Cl. 195—28)

This invention relates to the enzyme digestion of nucleic acids. More particularly the invention relates to enzymic materials capable of digesting ribonucleic acid and the use of such materials for hydrolyzing such acid under specific, controlled conditions in order to obtain specific hydrolysis products termed 5'-ribonucleotides.

Within the context of the present invention the term "RNA" should be understood to mean ribonucleic acid. The term "RNA derivatives" refers to ribonucleosides and ribonucleotides as well as compounds which are derivatives or homologues of these sub-units of RNA. A ribonucleoside is an N-glycoside of a heterocyclic base, generally a pyrimidine or purine. A ribonucleotide is a phosphoric acid ester of a ribonucleoside and may be ribonucleoside monophosphate or a ribonucleoside polyphosphate.

RNA is a polymeric molecule which occurs widely in nature—often in long chains ranging in molecular weight up to $10^6$ to $10^8$. It is presently thought that RNA polymers (found primarily in the cytoplasmic portions of cells), in various degrees of polymerization, are connected with the synthesis of specific proteins required by the cells. Monomeric nucleotides of RNA are found within cells in combination especially with many of the B vitamins, in which form they function as coenzymes promoting specific reactions necessary for the normal function of the organism.

The polymeric structure of ribonucleic acid and the relation of the polymer to the various possible degradation products may be represented schematically in the following diagram:

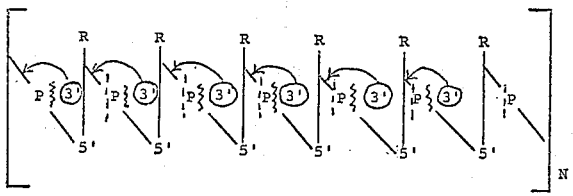

where: R may be a purine or pyrimidine base, most commonly in nature; adenine, guanine, uracil, or cytosine. The vertical heavy line represents a five-carbon sugar in pyranose configuration (d-ribose) and the numbers 3' and 5' represent respectively the third and fifth carbon of this sugar. P is a phosphate ester bridge connecting adjacent monomers through a linkage between the 3' and 5' carbons.

The polymer schematically shown may be degraded in many ways by a variety of enzymes which have been isolated from mammalian tissue, snake venom, and other living cells such as micro-organisms, at an extremely high cost. The procedure is thought to be usually stepwise with certain alternative pathways. In the illustration above, the enzyme with activity responsible for reducing the size of N (shortening the chain length) is called a nuclease or depolymerase. Once this shortening is accomplished the phosphate bridges can be attacked specifically either at points indicated by the dotted lines, or at the wavy lines. In the former case monomeric units with phosphate esters attached to the 5' position (5'-nucleotides) are the sole product whereas in the latter the products are 3'-nucleotides. The name most commonly given to the enzyme having this type of enzymic activity is "phosphodiesterase." There is a specific enzyme for each point of attack. Nucleotides may be subsequently further degraded by the splitting off of phosphate (by 3' or 5' phosphomonoesterases) and by further cleavage of the base (R) from the sugar. Enzymes which catalyze such hydrolysis are called nucleosidases. Finally, there is also enzyme activity in some cellular extracts which remove $NH_2$ radicals from bases which contain them. Such enzymes are referred to as deaminases.

Many of the degradation products outlined above have become significant articles of commerce because of their importance in research studies on the chemistry and properties of RNA. They are also used in pharmaceutical preparations. Also, the 5'-ribonucleotides (particularly inosine 5'-monophosphate (IMP) and guanosine 5'-monophosphate (GMP)) have become important as food flavoring enhancers.

It is an object of the present invention to provide a simple, economical, and expeditious method for preparing enzymic materials which are capable of hydrolyzing RNA.

It is another object of the present invention to provide a method for preparing stable enzymic materials which are capable of hydrolyzing RNA to produce high yields of ribonucleotides.

It is a further object of the invention to provide a simple, economical, and expeditious process for producing high yields of nucleotides from RNA using stable enzyme materials which are capable of hydrolyzing RNA to produce such nucleotides.

The above and other objects and features of the invention will appear more fully from the following description.

In accordance with the invention, it has been discovered that the rapidly proliferating parts (the rootlets and stems) of germinating seeds surprisingly constitute a particularly rich source of enzymes which are capable of readily splitting RNA. It has also been discovered that such enzymes may be simply and efficiently utilized for such splitting of RNA, particularly for the production of 5'-nucleotides.

The proliferating rootlets of the seeds are the richest source of enzymic material, the stems containing less, but useful quantities, whereas the seed or kernel itself does not contain a commercially attractive quantity. The property of the proliferating parts of the seed as a rich source of enzymic material is general property of seeds as a class and is particularly true of monocotyledon seeds. Preferable seeds are: those capable of being malted, such as oats, barley, wheat, corn, rye, mullet, sorghums, and rice; many varieties of grasses; sunflower; peas; and beans.

As certain seeds, such as barley (but also to a lesser extent wheat and rice), are commonly germinated in large quantities commercially, for the production of malt from which the rootlets are generally available as a by-product at low cost, the same are preferable for use in accordance with the invention and render the invention particularly interesting and valuable from a commercial standpoint.

Similarly, in some countries, bean seeds are germinated for the production of bean sprouts, making available a cheap and plentiful supply of these rootlets for the practice of the invention.

We have found that there is little or no loss of enzyme activity if the rootlets or stems are dried, even if such drying is at relatively high temperatures as is generally employed in kilning malt. Furthermore, this activity is retained in the rootlets for a number of years without any special precautions.

As mentioned, economic considerations and ready availability favor dried rootlets of barley malt (commercially known as "malt sprouts") as the preferred material. However, any readily available seed rootlet or sprout can be substituted, such as, for example, those from wheat malt, rice malt, or rye malt, or bean shoots, or any of those mentioned above.

In accordance with the present invention the uncomminuted rapidly proliferating parts of germinating seeds are initially treated to obtain an enzymic medium which is capable of hydrolyzing RNA to provide the desired high yields of nucleotides. The seed-parts, which are normally dry, are first either: soaked in water and then washed with a further quantity of water; or subjected to a multiplicity of washings with water. Where the initial treatment of seed-parts comprises soaking followed by washing, the soaking period should extend for from about 30 to 90 minutes to precondition and hydrate the seed-parts. The soaked seed-parts are thereafter washed with water to remove bacteria. The washing treatment is particularly important where the seed-parts comprise malted rootlets since such rootlets contain bacteria (resulting from the malting process) which, if not removed, proliferate enzymes destructive to 5'-nucleotides. The washing may be continuous with the waste water continuously removed or may be accomplished as a series of batch washings with the waste water removed after each wash period. The water utilized for soaking the seed-parts and/or washing the seed-parts should not be extremely "hard," i.e., contain more than about 1000 parts per million of hardness. Where the natural sources of water yield only "hard" water, the final washing of seed-parts should be preferably carried out using deionized or "soft" water.

As mentioned above, the soaking stage may be eliminated provided the washing period is sufficient to accomplish the desired hydration and preconditioning action. Also, to aid in the removal or destruction of harmful bacteria, small quantities of a suitable bactericide may be added to the wash water utilized during one or more of the washings.

After sufficient washing, additional water is mixed with the washed seed-parts in a preferred ratio of about 5 to 15 parts by weight of water to one part by weight of solids (seed-parts). Where the seed-parts comprise malt sprouts, the ratio of water to solids may be preferably about 10 to 1.

The water/seed-part suspension or slurry is next subjected to a relatively short heat treatment (about 0.5 to about 7 minutes and preferably 2 to 5 minutes) during which such suspension is agitated. To effect such treatment, steam may be directly introduced into the suspension in sufficient amount and for a sufficient time to rapidly establish and maintain the temperature of the suspension at between 70 to 85° C. and preferably 70 to 75° C. with optimum commercial results being achieved at about 72° C. Prior to the heating period, and while maintaining agitation of the suspension, phosphatase deactivators or inhibitors are added to the solution. Such deactivators may comprise: metallic ions (zinc), preferably $ZnAc_2 \cdot H_2O$, as a deactivator of 5'-ribonucleotidase; and borate ions (such as $H_3BO_3$) which may act as a deactivator of general phosphatases. During the heat treatment stage it is believed that the particular temperature and enzyme deactivator conditioning of the water/seed-part suspension results in destruction of phosphatase and monoesterase enzymes and other enzymes with the exception of ribonuclease and phosphodiesterase enzymes which are essential in the subsequent hydrolysis of RNA to 5'-ribonucleotides. For optimum commercial results the heating period is continued after the preferred 70 to 75° C. temperature is reached for a period of about 5 minutes with agitation of the heated suspension continuing for the entire period.

Enzymic media, prepared as described heretofore, have a broad spectrum of activity with respect to ribonucleic acid but, in accordance with the further embodiments of this invention, it has been discovered that by careful control of such activity a surprisingly high yield of 5'-nucleotides may be obtained by hydrolyzing such acid with such media in a relatively short time period. Thus, in accordance with the invention 5'-nucleotides may be selectively obtained from RNA by the reaction of a digestion solution of RNA and enzyme material heated to from about 60 to 70° C. for from about 1½ to about 5½ hours. The initial pH of the RNA solution may be as high as 8.5 and preferably the pH of the digestion solution does not decrease during hydrolysis to below about 5.2.

It is important that the seed-parts remain substantially in particulate form during the heat treatment stage and during the subsequent RNA hydrolysis stage. Many unexpected and surprising advantages are realized during the RNA hydrolysis by utilization of a heat treated enzyme medium comprised of water and the rapidly proliferating parts of germinating seeds wherein the seed-parts are not comminuted and remain as particulate matter in the medium. Improved enzymic medium to RNA solution ratios are possible. Radically shorter hydrolysis times are required. Significantly simplified solids separation procedures are required and there are less non-enzymatic impurities extracted into the hydrolyzate mixture. In general overall processing of the enzymic medium and hydrolyzate mixture is possible together with the attainment of exceptionally high yields of 5'-mononucleotides in the final hydrolyzed solution.

In accordance with the invention, a ribonucleic acid solution is introduced to a hydrolysis stage together with the enzymic medium (includes seed-parts) from the heat treating stage to form a digestion or hydrolysis solution including suspended seed-parts. The nucleic acid solution, for example, may comprise RNA, water, and appropriate amount of an alkaline material for adjusting the pH of such solution to the preferred alkaline range. Any of the well-known alkaline pH adjusting materials may be used such as: ammonium hydroxide and ammonium carbonate; sodium hydroxide; tris (hydroxy methyl) amino methane; and primary, secondary and tertiary amines which are water miscible.

It has furthermore been found that the presence of zinc ions in the digestion or hydrolysis solution (added to the enzymic medium and carried over to the digestion solution) accelerate the enzyme activity and that a concentration of zinc ions of between about 0.001M to 0.01M in the digestion solution increases the rate of hydrolysis. Addition of other ions such as calcium, copper, nickel, or iron, however, appears to inhibit the nucleic acid hydrolysis when using enzymic material obtained from malt sprouts as discussed above.

Using an enzymic medium (including seed-parts) as disclosed above and an aqueous RNA solution having an RNA concentration of up to 4–10%, the digestion or hydrolysis solution (enzymic medium including seed-parts+RNA solution including pH adjustment agent) may comprise about 2–4% RNA with the ratio of enzymic medium to RNA solution being from about 1:1 to about 3:1. The final digest solution, which may have its pH range adjusted periodically (if necessary) to maintain the same within the range of 5.2 to 8.5, is heated to from about 60 to about 70° C. (preferably 63 to 67°

C.) for from about 1½ hours to about 5½ hours to obtain maximum conversion of the RNA to 5'-ribonucleotides.

At the completion of hydrolysis the enzyme reaction must be quickly stopped. This may be accomplished by either: rapidly heating the hydrolysis solution to 80° C. or above for from about 10 to about 20 minutes; or by quickly cooling the hydrolysis solution to about 35° C. and acidifying such solution to about pH 3.5. Thereafter, the hydrolysis products and spent enzymic medium including spent seed-parts are introduced to a separation stage wherein the spent seed-parts are removed to form a final enzyme digest solution which is treated as described hereinafter.

The following examples and experiments are given to illustrate the present invention and are not to be construed as limiting.

EXAMPLE 1

A. *Preparation of seed-parts.*—66.6 kg. of dried malt sprout rootlets (Hannchen from National Malt Co.) were suspended in 800 liters of water and agitated for 20 minutes. The supernatant liquid was drawn out of the bottom of the wash-mix tank and discarded. Fresh water in the amount of 830 liters was introduced into the wash-mix tank and the mixture agitated for an additional 20 minutes with the wash liquid again drawn out of the tank and discarded. Three additional washings of similar duration were made using substantially equivalent amounts of water.

B. *Pretreatment of seed-parts.*—After the fifth washing the clean wet sprouts were mixed with 830 liters of fresh water with 210 g. of $ZnAc_2 \cdot H_2O$ and 666 g. of $H_3BO_3$ added to the mixture to selectively suppress enzyme activity.

The water/seed-part mixture was then rapidly heated with direct steam, while agitating, to 72° C. with the temperature of the mixture maintained at between 71.3° C. and 72.3° C. for 5 minutes.

C. *Hydrolysis of RNA.*—150 liters of RNA solution (30 kg. of commercial RNA and 500 g. NaF) at pH 7.0–7.1 (adjusted with NaOH) and at 15–20° C. was added rapidly to the above pretreated water/seed-part suspension with the total mixture agitated and the temperature adjusted to about 65° C. Agitation was continued and the temperature maintained at between 64.5° C. and 65.5° C. for 2 hours. Analysis of the hydrolysis solution indicated nucleic acid degradation to be 95% with 90% 5'-nucleotides present. The hydrolysis was stopped by lowering the temperature of the mixture to 35° C. and adjusting the pH to 3.4–3.6 by the addition of HCl. The digest solution was filtered to remove the spent plant parts with the filtrate further treated to obtain the desired 5'-nucleotides free of impurities.

The following tables set forth additional examples to further illustrate the invention.

TABLE I.—SEED-PART PRETREATMENT

| Example | Seed-Part* Weight, kg. | Wash Water Vol./Wash, liters | No. of Washes, 20 Min. Each | Vol. of Washed Seed-Parts, liters | Total Vol. Pretreatment Mixture, liters | Pretreatment Time, min. | Pretreatment Temp., ° C. |
|---|---|---|---|---|---|---|---|
| 2 | 68.2 | 740 | 5 | 532 | 800 | 5 | 71.5 |
| 3 | 68.3 | 784 | 5 | 473 | 947 | 4 | 70.0 |
| 4 | 67.5 | 710 | 5 | 414 | 730 | 7 | 71.0 |
| 5 | 66.0 | 710 | 5 | 370 | 730 | 5 | 70.5 |
| 6 | 66.0 | 710 | 5 | 340 | 750 | 4 | 71.0 |
| 7 | 66.0 | 710 | 5 | 340 | 714 | 2 | 70.5 |

*Seed Parts—Hannchen dried malt sprouts from National Malt Company.

TABLE II.—RNA HYDROLYSIS

| Example | RNA Wt., kg. | RNA Solution Vol., liters | RNA Solution Temp. at Addition, ° C. | RNA Solution, pH | Hydrolysis Time, hrs. | Hydrolysis Temp., ° C. | Final RNA Degradation, Percent | Final Free Phos., Percent | Final 5'-Nucleotides, Percent |
|---|---|---|---|---|---|---|---|---|---|
| 2 | 30 | 250 | 46 | 7.0 | 5 | 65 | 84.5 | 9.7 | 74.8 |
| 3 | 30 | 230 | 46 | 8.5 | 3 | 65 | 92.0 | 9.7 | 82.3 |
| 4 | 30 | 230 | 46 | 8.5 | 3¼ | 65 | 90.0 | 7.4 | 82.6 |
| 5 | 27 | 200 | 46 | 8.5 | 5 | 65 | 99.0 | 12.3 | 86.7 |
| 6 | 30 | 233 | 46 | 8.5 | 4 | 65 | 93.0 | 10.6 | 82.4 |
| 7 | 30 | 233 | 43 | 8.5 | 5½ | 65 | 87.4 | 13.0 | 74.4 |

Examples 1 through 7 above relate to processing in accordance with the invention wherein the dried seed-parts are washed without previous soaking. Examples 8 through 10, set forth in table form below, relate to processing wherein the dried seed-parts (Hannchen malt sprouts from National Malt Co.) are soaked in water for varying time periods and thereafter washed once for 25 minutes.

TABLE III.—SEED-PART PRETREATMENT

| Example | Seed Part Weight, kg. | Soak Water liters | Soaking Time, min. | Wash Water, liters | Vol. Washed Seed-Parts, liters | Total Vol. Pretreatment Mixture liters | Pretreatment Time, min. | Pretreatment Temp., ° C. |
|---|---|---|---|---|---|---|---|---|
| 8 | 68.0 | 710 | 30 | 710 | 370 | 800 | 5 | 70.5 |
| 9 | 68.2 | 710 | 60 | 720 | 380 | 820 | 5 | 70.5 |
| 10 | 66.0 | 740 | 90 | 740 | 400 | 860 | 5 | 70.5 |

TABLE IV.—RNA HYDROLYSIS

| Example | RNA Wt., kg. | RNA Solution Vol., liters | RNA Solution Temp. at Addition, °C. | RNA Solution, pH | Hydrolysis Time, hrs. | Hydrolysis Temp., °C. | Final RNA Degradation, Percent | Final Free Phos., Percent | Final 5'-Nucleotides, Percent |
|---|---|---|---|---|---|---|---|---|---|
| 8 | 30 | 230 | 45 | 8.5 | 4 | 65 | 78.6 | 6.2 | 72 |
| 9 | 30 | 230 | 46 | 8.5 | 4 | 65 | 83.5 | 6.5 | 77.4 |
| 10 | 30 | 250 | 46 | 8.5 | 4 | 65 | 88.2 | 6.5 | 81.0 |

A series of experiments was carried out to determine optimum processing conditions and parameters of operating conditions for producing 5'-mononucleotides in accordance with the invention. Experiments ($a_1$) through ($o_3$) set forth in table form below, relate to processing wherein uniform lots of dried seed-parts (Hannchen dried malt sprouts from National Malt Co.) were: (1) subjected to five washings each with water; (2) mixed with water in a ratio of 1.0 kg. of sprouts to 10.0 liters of water; and (3) heat treated as indicated in the table. The resulting enzymic medium (including the malt sprouts) in each instance was then: (1) mixed with a 9.0% RNA solution (initial pH of about 7.0) in a ratio of 2.2 kg. of dried sprouts to 1.0 kg. of commercial RNA (about 90%); (2) hydrolyzed at about 65° C. for periods of time as indicated. The hydrolysis mixture (as a result of the above proportions) contained 3% RNA. The hydrolyzate (after stopping the enzyme action) was analyzed (as indicated in the table) to determine the resulting percent of nucleotides.

Analysis of the experiments set forth in Table V reveals that optimum hydrolysis to form 5'-nucleotides occurs when the heat treatment of the enzymic medium is carried out for about 5 minutes at 70 to 75° C. and the hydrolysis is effected at pH 7.0 (initial pH of the RNA solution) and 65° C. and is run for 2 to 2½ hours.

EXAMPLE 11

A further series of experiments was carried out to determine additional processing conditions. Experiments ($p_1$) through ($z_3$), set forth in table form below, relate to processing wherein uniform lots of dried seed-parts (same malt sprouts and quantities as in Example 10) were: (1) subject to five washings each with water; (2) mixed with water in a ratio of 1.0 kg. of sprouts to 10.0 liters of water; and (3) heat treated as indicated in the table. The resulting enzymic medium (including malt sprouts) in each instance was then: (1) mixed with a 9.0% RNA solution in a ratio of 2.2 kg. of dried sprouts to 1.0 kg. of commercial RNA (about 90%); and (2) hydrolyzed under varying temperatures and RNA solu-

TABLE V

| Experiment | Heat Treatment | | Hydrolysis, Time, hours | Hydrolyzate Analysis | | |
|---|---|---|---|---|---|---|
| | Temp., °C. | Time, min. | | RNA Degradation, percent | Free Phos., percent | 5'-Nucleotides, percent |
| ($a_1$) | 65 | 5 | 1½ | 83.6 | 36.2 | 47.4 |
| ($a_2$) | 65 | 5 | 2 | 92.4 | 43.4 | 49.0 |
| ($a_3$) | 65 | 5 | 2½ | 95.9 | 48.6 | 47.3 |
| ($b_1$) | 65 | 10 | 1½ | 86.4 | 25.8 | 60.6 |
| ($b_2$) | 65 | 10 | 2 | 91.2 | 30.7 | 60.5 |
| ($b_3$) | 65 | 10 | 2½ | 96.1 | 35.8 | 60.3 |
| ($c_1$) | 65 | 20 | 1½ | 88.7 | 16.0 | 72.7 |
| ($c_2$) | 65 | 20 | 2 | 94.5 | 19.5 | 75.0 |
| ($c_3$) | 65 | 20 | 2½ | 95.1 | 22.4 | 72.7 |
| ($d_1$) | 65 | 40 | 1½ | 87.8 | 6.5 | 81.3 |
| ($d_2$) | 65 | 40 | 2 | 91.4 | 7.5 | 83.9 |
| ($d_3$) | 65 | 40 | 2½ | 95.4 | 8.3 | 87.1 |
| ($d_4$) | 65 | 40 | 5 | 97.7 | 11.0 | 86.7 |
| ($e_1$) | 70 | 5 | 1½ | 88.8 | 5.2 | 83.5 |
| ($e_2$) | 70 | 5 | 2 | 93.5 | 6.2 | 87.3 |
| ($e_3$) | 70 | 5 | 2½ | 96.6 | 6.7 | 89.9 |
| ($e_4$) | 70 | 5 | 5 | 96.5 | 9.5 | 87.0 |
| ($f_1$) | 70 | 10 | 1½ | 88.1 | 3.6 | 84.5 |
| ($f_2$) | 70 | 10 | 2 | 91.1 | 4.1 | 87.0 |
| ($f_3$) | 70 | 10 | 2½ | 93.0 | 4.5 | 88.5 |
| ($g_1$) | 70 | 20 | 1½ | 86.2 | 4.4 | 81.8 |
| ($g_2$) | 70 | 20 | 2 | 89.6 | 4.4 | 85.2 |
| ($g_3$) | 70 | 20 | 2½ | 92.4 | 5.0 | 87.4 |
| ($h_1$) | 72 | 3 | 1½ | 88.8 | 4.9 | 83.9 |
| ($h_2$) | 72 | 3 | 2 | 91.0 | 6.6 | 84.4 |
| ($h_3$) | 72 | 3 | 2½ | 93.7 | 6.3 | 87.4 |
| ($i_1$) | 72 | 5 | 1½ | 87.4 | 4.4 | 83.0 |
| ($i_2$) | 72 | 5 | 2 | 91.3 | 5.4 | 85.9 |
| ($i_3$) | 72 | 5 | 3 | 94.8 | 6.1 | 88.7 |
| ($i_4$) | 72 | 5 | 4 | 94.4 | 6.9 | 87.5 |
| ($j_1$) | 72 | 10 | 1½ | 85.8 | 3.9 | 81.9 |
| ($j_2$) | 72 | 10 | 2 | 90.9 | 4.5 | 86.4 |
| ($j_3$) | 72 | 10 | 2½ | 90.3 | 4.7 | 85.6 |
| ($k_1$) | 72 | 20 | 1½ | 84.1 | 3.7 | 80.4 |
| ($k_2$) | 72 | 20 | 2 | 89.3 | 4.1 | 95.2 |
| ($k_3$) | 72 | 20 | 2½ | 90.9 | 4.4 | 86.5 |
| ($l_1$) | 75 | 3 | 1½ | 84.4 | 4.2 | 80.2 |
| ($l_2$) | 75 | 3 | 2 | 88.7 | 3.9 | 84.8 |
| ($l_3$) | 75 | 3 | 2½ | 92.1 | 4.2 | 87.9 |
| ($m_1$) | 75 | 5 | 1½ | 89.5 | 3.7 | 86.5 |
| ($m_2$) | 75 | 5 | 2 | 92.2 | 3.3 | 88.9 |
| ($m_3$) | 75 | 5 | 2½ | 91.9 | 3.7 | 88.2 |
| ($m_4$) | 75 | 5 | 5 | 94.4 | 5.7 | 88.7 |
| ($n_1$) | 75 | 10 | 1½ | 86.1 | 2.7 | 83.4 |
| ($n_2$) | 75 | 10 | 2 | 90.3 | 3.1 | 87.2 |
| ($n_3$) | 75 | 10 | 2½ | 91.8 | 3.3 | 88.5 |
| ($o_1$) | 75 | 20 | 1½ | 83.9 | 2.7 | 81.2 |
| ($o_2$) | 75 | 20 | 2 | 89.9 | 3.2 | 86.7 |
| ($o_3$) | 75 | 20 | 2½ | 91.3 | 3.4 | 87.9 | tion pH conditions as set forth below and for periods of time as indicated. The hydrolysis mixture (as a result of the above proportions) contained 3% RNA. The hydrolyzate (after stopping the enzyme action) was analyzed (as indicated in the table) to determine the resulting percent of nucleotides.

EXAMPLE 13

Additional experiments were carried out to confirm the discovery that substantially more useful enzyme activity may be derived from the rapidly proliferating parts of germinating seeds than from the seed or kernal portion per se.

TABLE VI

| Experiment | Heat Treatment | | Hydrolysis | | | Hydrolyzate Analysis | | |
|---|---|---|---|---|---|---|---|---|
| | Temp., °C. | Time, min. | pH | Temp., °C. | Time, hours | RNA Degradation, percent | Free Phos., percent | 5'-Nucleotides, percent |
| ($p_1$) | 72 | 5 | 7.0 | 65 | 1½ | 87.4 | 4.4 | 83.0 |
| ($p_2$) | 72 | 5 | 7.0 | 65 | 2 | 91.3 | 5.4 | 85.9 |
| ($p_3$) | 72 | 5 | 7.0 | 65 | 3 | 94.8 | 6.1 | 88.7 |
| ($p_4$) | 72 | 5 | 7.0 | 65 | 4 | 94.4 | 6.9 | 87.5 |
| ($q_1$) | 80 | 3 | 7.0 | 65 | 1½ | 65.6 | 2.7 | 62.9 |
| ($q_2$) | 80 | 3 | 7.0 | 65 | 2 | 74.3 | 2.9 | 71.4 |
| ($q_3$) | 80 | 3 | 7.0 | 65 | 2½ | 79.5 | 3.2 | 76.3 |
| ($r_1$) | 80 | 2 | 7.0 | 65 | 1½ | 72.9 | 3.0 | 69.9 |
| ($r_2$) | 80 | 2 | 7.0 | 65 | 2 | 81.9 | 3.3 | 78.6 |
| ($r_3$) | 80 | 2 | 7.0 | 65 | 2½ | 87.2 | 3.7 | 83.2 |
| ($s_1$) | 90 | 1 | 7.0 | 65 | 1½ | 13.7 | 0.0 | 13.7 |
| ($s_2$) | 90 | 1 | 7.0 | 65 | 2 | 17.5 | 0.1 | 17.4 |
| ($s_3$) | 90 | 1 | 7.0 | 65 | 2½ | 19.9 | 0.4 | 19.5 |
| ($t_1$) | 72 | 5 | 6.0 | 65 | 1½ | 85.9 | 4.1 | 81.8 |
| ($t_2$) | 72 | 5 | 6.0 | 65 | 2 | 91.5 | 4.8 | 86.7 |
| ($t_3$) | 72 | 5 | 6.0 | 65 | 2½ | 92.2 | 5.3 | 86.9 |
| ($u_1$) | 72 | 5 | 7.0 | 65 | 1½ | 87.4 | 4.4 | 83.0 |
| ($u_2$) | 72 | 5 | 7.0 | 65 | 2 | 91.3 | 5.4 | 85.9 |
| ($u_3$) | 72 | 5 | 7.0 | 65 | 3 | 94.8 | 6.1 | 88.7 |
| ($u_4$) | 72 | 5 | 7.0 | 65 | 4 | 94.4 | 6.9 | 87.5 |
| ($v_1$) | 72 | 5 | 8.0 | 65 | 1½ | 88.0 | 4.0 | 84.0 |
| ($v_2$) | 72 | 5 | 8.0 | 65 | 2 | 90.1 | 4.7 | 85.4 |
| ($v_3$) | 72 | 5 | 8.0 | 65 | 2½ | 92.0 | 5.0 | 87.0 |
| ($w_1$) | 72 | 5 | 8.5 | 65 | 1½ | 87.2 | 4.9 | 82.3 |
| ($w_2$) | 72 | 5 | 8.5 | 65 | 2 | 91.9 | 5.3 | 86.6 |
| ($w_3$) | 72 | 5 | 8.5 | 65 | 2½ | 91.9 | 5.8 | 86.1 |
| ($x_1$) | 72 | 5 | 7.0 | 60 | 1½ | 77.8 | 4.1 | 73.7 |
| ($x_2$) | 72 | 5 | 7.0 | 60 | 2 | 87.0 | 4.6 | 82.4 |
| ($x_3$) | 72 | 5 | 7.0 | 60 | 2½ | 88.1 | 5.1 | 83.0 |
| ($y_1$) | 72 | 5 | 7.0 | 65 | 1½ | 87.4 | 4.4 | 83.0 |
| ($y_2$) | 72 | 5 | 7.0 | 65 | 2 | 91.3 | 5.4 | 85.9 |
| ($y_3$) | 72 | 5 | 7.0 | 65 | 3 | 94.8 | 6.1 | 88.7 |
| ($y_4$) | 72 | 5 | 7.0 | 65 | 4 | 94.4 | 6.9 | 87.5 |
| ($z_1$) | 72 | 5 | 7.0 | 70 | 1½ | 89.3 | 5.7 | 83.6 |
| ($z_2$) | 72 | 5 | 7.0 | 70 | 2 | 92.5 | 6.5 | 86.0 |
| ($z_3$) | 72 | 5 | 7.0 | 70 | 2½ | 92.7 | 7.0 | 85.7 |

Analysis of the experiments set forth in Table VI reveals that optimum practical hydrolysis to form 5'-nucleotides occurs when the heat treatment of the enzymic medium is carried out for about 5 minute at about 72° C. and the hydrolysis is effected at pH 6.0 to 8.5, 65 to 75° C. for 2 to 3 hours.

EXAMPLE 12

Experiments were carried out to determine the effectiveness of enzymic media formed with the rapidly proliferating parts of other seeds. Table VII below, reveals the hydrolysis results of uniform processing in accordance with the invention for like quantities of mung bean sprouts, soy bean sprouts, and the rootlets of oats, wheat and rice.

A portion of malt sprouts was washed five times with water and thereafter mixed with water and heat treated at 72° C. for five minutes with the addition of zinc ion to the mixture at the initiation of the heat treatment. The sprouts were separated by filtration and mixed wih RNA solution at pH 7.0. The final RNA concentration of the mixture was 3%. NaF was added so that the final solution contained 0.001M Zn and 0.05% NaF. The solution was heated to, and maintained at, 65° C. The results of the analysis of the hydrolyzate appear in Table VIII.

A portion of whole malt grains was washed five times with water and separated into two equal parts. One part

TABLE VII

| Experiment | Plant Parts | Hydrolysis, Time, hours | Hydrolyzate Analysis | | |
|---|---|---|---|---|---|
| | | | RNA Degraded, percent | Free Phos., percent | 5'-Nucleotides, percent |
| 1 | Mung Bean Sprouts | 1½ | 30.5 | | |
| 2 | do | 2½ | 44.2 | | |
| 3 | do | 3½ | 55.6 | 15.2 | 40.4 |
| 4 | Soy Bean Sprouts | 1½ | 17.5 | | |
| 5 | do | 2½ | 25.2 | | |
| 6 | do | 3½ | 34.0 | 12.9 | 21.1 |
| 7 | Oat Rootlets | 1½ | 33.2 | | |
| 8 | do | 2½ | 45.6 | 18.6 | 27.0 |
| 9 | Wheat Rootlets | 1½ | 91.7 | | |
| 10 | do | 2 | 93.0 | | |
| 11 | do | 3 | 93.6 | 27.5 | 66.1 |
| 12 | Rice Rootlets | 1½ | 59.9 | 12.6 | 47.3 |
| 13 | do | 2½ | 76.3 | 15.8 | 60.5 |
| 14 | do | 3½ | 83.1 | 18.2 | 64.9 | was ground in a Waring Blendor. Both parts were mixed with equal proportions of water with zinc ion added and heat treated at 72° C. for five minutes. The quantities of water and seed-parts were the same as used during the foregoing experiments involving malt sprouts. Both enzymic media (ground grains and unground grains) were mixed with RNA solution at pH 7.0. The final RNA concentration of both mixtures was 3%. NaF was added as above. Each solution was heated to, and maintained at, 65° C. The results of the analysis of the hydrolyzate appear in Table VIII.

TABLE VIII

| Enzymic Media | Time of Hydrolysis, Hours | Hydrolyzate Analysis | | |
|---|---|---|---|---|
| | | RNA Degraded, percent | Free Phos., percent | 5'-Nucleotides, percent |
| Filtered Sprouts | 1½ | 96.2 | 8.9 | 87.3 |
| Do | 2 | 100.0 | 9.8 | 91.2 |
| Ground Malt Grain | 1½ | 50.0 | 9.5 | 40.5 |
| Do | 2 | 46.0 | 11.0 | 35.0 |
| Do | 3 | 51.6 | 13.0 | 38.6 |
| Whole Malt Grain | 1½ | 9.4 | 3.8 | 4.6 |
| Do | 2 | 11.3 | 4.3 | 7.0 |
| Do | 3 | | | |

After hydrolysis of the RNA to 5'-nucleotides, impurities which may hamper subsequent separation of the 5'-nucleotides are removed. Such impurities are mainly (1) inorganic phosphates, (2) protein from the enzymic medium, (3) small amounts of unhydrolyzed nucleic acid, and (4) nucleosides. The first three can be removed by at least two methods. One method involves the addition of barium hydroxide to pH of 9.0. The barium hydroxide addition stops enzyme action immediately and causes precipitation of impurities which can be removed from the 5'-nucleotide solution by filtration. This method may result in the removal of small amounts of the desired 5'-nucleotides, particularly purine nucleotides.

A second method of removing impurities involves the addition to the hydrolysis solution of alcohol to stop enzyme action and precipitate protein and some sodium phosphate. Small amounts of purine nucleotides are also precipitated. The precipitate is filtered off and the filtrate used to separate 5'-nucleotides.

Whichever of the above methods for purifying the hydrolyzate is used, the filtrate (after removal of impurities) contains nucleotides which may be separated by well-known ion-exchange techniques.

It should be understood that an enzymic media comprised of water and uncomminuted seed-parts (which has been heat treated in a manner similar to that described herein before) may be utilized to degrade or digest deoxyribonucleic acid to form 5'-deoxyribonucleotides.

While the foregoing specification sets forth preferred embodiments of the invention, it is to be understood that the invention is not limited to the exact details shown and described, and that variations and modifications may be made in conventional manner without departing from the scope of the invention as defined in the appended claims.

We claim:
1. A process for hydrolyzing ribonucleic acid to form primarily 5'-ribonucleotides which comprises:
mixing water with a quantity of discrete rapidly proliferating substantially non-comminuted seed-parts selected from the group consisting of substantially seed-free germinating seed rootlets and substantially seed-free germinating seed stems to form an enzymic medium for hydrolyzing ribonucleic acid;
adding deactivator material selectively capable of deactivating phosphatase enzymes to said enzymic medium;
agitating and heating said enzymic medium, including said deactivator material, for from about 0.5 to about 7 minutes at a temperature of from about 70 to about 85° C. whereby said deactivator material and said heat treatment substantially destroy phosphatase enzymes, monoesterase enzymes and enzymes other than ribonuclease and phosphodiesterase enzymes;
mixing said enzymic medium, including said substantially non-comminuted seed-parts, after said heat treatment with a quantity of ribonucleic acid to be hydrolyzed;
heating the mixture of enzymic medium, including said substantially non-comminuted seed-parts, and ribonucleic acid to from about 60 to about 70° C. for from about 1½ to about 5½ hours whereby said acid is hydrolyzed primarily to 5'-ribonucleotides;
separating spent seed-parts from the aqueous hydrolysis mixture containing 5'-ribonucleotides; and;
recovering said 5'-ribonucleotides from said solids-free hydrolysis mixture.

2. A process for hydrolyzing ribonucleic acid to form primarily 5'-ribonucleotides which comprises:
mixing water with a quantity of discrete rapidly proliferating substantially non-comminuted seed-parts selected from the group consisting of substantially seed-free germinating seed rootlets and substantially seed-free germinating seed stems to form an enzymic medium for hydrolyzing ribonucleic acid;
adding deactivator material selectively capable of deactivating phosphatase enzymes including a quantity of metal ions to said enzymic medium;
agitating and heating said enzymic medium, including said deactivator material, for from about 0.5 to about 7 minutes at a temperature of from about 70 to about 85° C. whereby said deactivator material and said heat treatment substantially destroy phosphatase enzymes, monoesterase enzymes and enzymes other than ribonuclease and phosphodiesterase enzymes;
mixing said enzymic medium, including said substantially non-comminuted seed-parts, after said heat treatment with a quantity of ribonucleic acid to be hydrolyzed;
heating the mixture of enzymic medium, including said substantially non-comminuted seed-parts, and ribonucleic acid to from about 60 to about 70° C. for from about 1½ to about 5½ hours whereby said acid is hydrolyzed primarily to 5'-ribonucleotides;
inactivating the ribonuclease and phosphodiesterase enzymes to stop the hydrolysis reaction;
separating spent seed-parts from the aqueous hydrolysis mixture containing 5'-ribonucleotides; and;
recovering said 5'-ribonucleotides from said solids-free hydrolysis mixture.

3. A process for hydrolyzing ribonucleic acid to form primarily 5'-ribonucleotides which comprises:
washing a quantity of discrete rapidly proliferating substantially non-comminuted seed-parts selected from the group consisting of substantially seed-free germinating seed rootlets and substantially seed-free germinating seed stems with water to remove bacteria therefrom;

mixing water with said washed discrete substantially non-comminuted seed-parts to form an enzymic medium for hydrolyzing ribonucleic acid;

adding deactivator material selectively capable of deactivating phosphatase enzymes to said enzymic medium;

agitating and heating said enzymic medium, including said deactivator material, for from about 0.5 to about 7 minutes at a temperature of from about 70 to about 85° C. whereby said deactivator material and said heat treatment substantially destroy phosphatase enzymes, monoesterase enzymes and enzymes other than ribonuclease and phosphodiesterase enzymes;

mixing said enzymic medium, including said substantially non-comminuted seed-parts, after said heat treatment with a quantity of aqueous ribonucleic acid solution to be hydrolyzed;

heating the mixture of enzymic medium, including said substantially non-comminuted seed-parts, and ribonucleic acid solution to from about 60 to about 70° C. for from about 1½ to about 5½ hours whereby said acid is hydrolyzed primarily to 5'-ribonucleotides; and separating spent seed-parts from the aqueous hydrolysis mixture containing 5'-ribonucleotides.

4. A process for hydrolyzing ribonucleic acid to form primarily 5'-ribonucleotides which comprises:

soaking a quantity of discrete rapidly proliferating substantially non-comminuted seed-parts selected from the group consisting of substantially seed-free germinating seed rootlets and substantially seed-free germinating seed stems in water to hydrate said seed-parts;

washing the hydrated substantially non-comminuted seed-parts with water to remove bacterial therefrom;

mixing water with said washed discrete substantially non-comminuted seed-parts to form an enzymic medium for hydrolyzing ribonucleic acid;

adding deactivator material selectively capable of deactivating phosphatase enzymes to said enzymic medium;

agitating and heating said enzymic medium, including said deactivator material, for from about 0.5 to about 7 minutes at a temperature of from about 70 to about 85° C. whereby said deactivator material and said heat treatment substantially destroy phosphatase enzymes, monoesterase enzymes and enzymes other than ribonuclease and phosphodiesterase enzymes;

mixing said enzymic medium, including said substantially non-comminuted seed-parts, after said heat treatment with a quantity of aqueous ribonucleic acid solution to be hydrolyzed;

heating the mixture of enzymic medium, including said substantially non-comminuted seed-parts, and ribonucleic acid solution to from about 60 to about 70° C. for from about 1½ to about 5½ hours whereby said acid is hydrolyzed primarily to 5'-ribonucleotides; and separating spent seed-parts from the aqueous hydrolysis mixture containing 5'-ribonucleotides.

5. A process for hydrolyzing nucleic acid to form primarily 5'-nucleotides which comprises:

mixing water with a quantity of discrete rapidly proliferating substantially non-comminuted seed-parts selected from the group consisting of substantially seed-free germinating seed rootlets and substantially seed-free germinating seed stems to form an enzymic medium for hydrolyzing nucleic acid;

adding deactivator material selectively capable of deactivating phosphatase enzymes to said enzymic medium;

agitating and heating said enzymic medium, including said deactivator material, for a time and at a temperature sufficient whereby said deactivator material and said heat treatment substantially destroy phosphatase enzymes and other enzymes inhibitory to the degradation of nucleic acid to form primarily 5'-nucleotides;

mixing said enzymic medium, including said substantially non-comminuted seed-parts, after said heat treatment with a quantity of aqueous nucleic acid solution to be hydrolyzed;

heating the mixture of enzymic medium, including said substantially non-comminuted seed-parts, and nucleic acid solution for a time and at a temperature sufficient to hydrolyze said acid to form primarily 5'-nucleotides; and separating spent seed-parts from the aqueous hydrolysis mixture containing 5'-nucleotides.

6. A process for hydrolyzing ribonucleic acid to form primarily 5'-ribonucleotides which comprises:

mixing water with a quantity of discrete rapidly proliferating substantially non-comminuted seed-parts selected from the group consisting of substantially seed-free germinating seed rootlets and substantially seed-free seed stems to form an enzymic medium for hydrolyzing ribonucleic acid;

adding deactivator materials to said enzymic medium, one of said deactivator materials comprising a quantity of zinc ions selectively capable of deactivating 5'-ribonucleotidase enzymes and another of said deactivator materials comprising a quantity of borate ions selectively capable of deactivating general phosphatase enzymes;

agitating and heating said enzymic medium, including said deactivator materials, for from about 0.5 to about 7 minutes at a temperature of from about 70 to about 85° C. whereby said deactivator materials and said heat treatment substantially destroy phosphatase enzymes, monoesterase enzymes and enzymes other than ribonuclease and phosphodiesterase enzymes;

mixing said enzymic medium, including said substantially non-comminuted seed-parts, after said heat treatment with a quantity of aqueous ribonucleic acid solutions to be hydrolyzed;

heating the mixture of enzymic medium, including said substantially non-comminuted seed-parts, and ribonucleic acid solution to from about 60 to about 70° C. for from about 1½ to about 5½ hours whereby said acid is hydrolyzed primarily to 5'-ribonucleotides;

inactivating the ribonuclease and phosphodiesterase enzymes to stop the hydrolysis reaction;

separating spent seed-parts from the aqueous hydrolysis mixture containing 5'-ribonucleotides and other products of hydrolysis; and;

recovering said 5'-ribonucleotides from said solids-free hydrolysis mixture.

7. The process for hydrolyzing ribonucleic acid to form primarily 5'-ribonucleotides as claimed in claim 6 where the enzymic medium, including the enzyme deactivator materials, is heated for from about 2 to 5 minutes at a temperature of from about 70 to 75° C.

8. The process for hydrolyzing ribonucleic acid to form primarily 5'-ribonucleotides as claimed in claim 6 wherein the mixture of enzymic medium, including substantially non-comminuted seed-parts, and ribonucleic acid solution is heated to from about 63 to about 67° C. for from about 1½ hours to about 3 hours.

9. The process for hydrolyzing ribonucleic acid to form primarily 5'-ribonucleotides as claimed in claim 6 wherein the ribonucleic acid solution has an initial pH of up to about 8.5 and the pH of the mixture of enzymic medium and ribonucleic acid solution during hydrolysis is maintained above about 5.2.

10. The process for hydrolyzing ribonucleic acid to form primarily 5'-ribonucleotides as claimed in claim 6 wherein the ribonuclease and phosphodiesterase enzymes are inactivated by cooling the hydrolysis reaction mixture to about 35° C. and acidifying such mixture to about pH 3.5.

11. The process for hydrolyzing ribonucleic acid to form primarily 5'-ribonucleotides as claimed in claim 6 wherein the ribonuclease and phosphodiesterase enzymes are inactivated by heating the hydrolysis reaction mixture to above about 80° C. for from about 10 to about 20 minutes.

12. The process for hydrolyzing ribonucleic acid to form primarily 5'-ribonucleotides as claimed in claim 6 wherein the enzymic medium for hydrolyzing ribonucleic acid is comprised of about 5 to about 15 parts by weight of water to about 1 part by weight of discrete rapidly proliferating substantially non-comminuted seed-parts.

13. The process for hydrolyzing ribonucleic acid to form primarily 5'-ribonucleotides as claimed in claim 12 wherein the enzymic medium is preferably comprised of about 10 parts by weight of water to about 1 part by weight of discrete rapidly proliferating substantially non-comminuted seed-parts.

14. The process for hydrolyzing ribonucleic acid to form primarily 5'-ribonucleotides as claimed in claim 6 wherein at least 0.001M of zinc ions is added to the enzymic medium as the enzyme deactivator material.

15. The process for hydrolyzing ribonucleic acid to form primarily 5'-ribonucleotides as claimed in claim 6 wherein zinc ion is added to the enzymic medium in sufficient amount so as to result in a residue of zinc ions in the mixture of enzymic medium and ribonucleic acid solution of about 0.001M to about 0.01M to increase the rate of hydrolysis.

16. The process for hydrolyzing ribonucleic acid to form primarily 5'-ribonucleotides as claimed in claim 6 wherein the ratio of enzymic medium to ribonucleic acid in hydrolysis mixture is about 1 to about 3 parts by weight of enzymic medium to about 1 part by weight of ribonucleic acid in an aqueous solution comprising up to about 10% ribonucleic acid.

17. In the process of hydrolyzing nucleic acids with an enzymic medium rich in nuclease and phosphodiesterase enzymes to form primarily 5'-nucleotides, the improvement which comprises:

utilizing an aqueous suspension of discrete rapidly proliferating substantially non-comminuted seed-parts selected from the group consisting of substantially seed-free germinating seed rootlets and substantially seed-free germinating seed-stems as the enzymic medium, said medium having been substantially freed of enzymes which interfere with said hydrolysis (including phosphatase enzymes and monoesterase enzymes) by pre-hydrolysis heat treatment thereof at a temperature of from about 70 to about 85° C. for from about 0.5 to about 7 minutes in the presence of deactivator material selectively capable with said heat treatment of inactivating said interfering enzymes; and separating spent seed-parts from the aqueous hydrolysis mixture containing 5'-nucleotides.

References Cited by the Examiner
UNITED STATES PATENTS

| | | | |
|---|---|---|---|
| 3,120,511 | 2/1964 | Tanaka et al. | 195—28 |
| 3,163,586 | 12/1964 | Ishido et al. | 195—28 |
| 3,168,446 | 2/1965 | Omura et al. | 195—28 |

OTHER REFERENCES

Cook, Barley and Malt Biology, Biochemistry, Technology, pub. by Academic Press, New York, 1962, pp. 432 and 433.

Kuninaka et al., Agr. Biol. Chem., vol. 25, No. 9, pp. 693–701, 1961.

Schlamowitz et al., J. Biol. Chem., vol. 163, pp. 487–497, (1946).

Shuster, Journal of Biological Chemistry, pp. 289–303, November-December 1957.

HYMAN LORD, *Primary Examiner.*

ALVIN E. TANENHOLTZ, A. LOUIS MONACELL,
*Examiners.*